US009923197B2

(12) United States Patent
Lee et al.

(10) Patent No.: US 9,923,197 B2
(45) Date of Patent: Mar. 20, 2018

(54) COMPOSITE NEGATIVE ACTIVE MATERIAL AND METHOD OF PREPARING THE SAME, NEGATIVE ELECTRODE INCLUDING COMPOSITE NEGATIVE ACTIVE MATERIAL, AND LITHIUM SECONDARY BATTERY INCLUDING NEGATIVE ELECTRODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Byoungsun Lee, Seoul (KR); Heechul Jung, Gunpo-si (KR); Kanghee Lee, Suwon-si (KR); Jinhwan Park, Seoul (KR); Changhoon Jung, Seoul (KR); Kihong Kim, Asan-si (KR); Yoonsok Kang, Seongnam-si (KR); Dongyoung Kim, Yongin-si (KR)

(73) Assignees: SAMSUNG ELECTRONICS CO., LTD., Gyeonggi-do (KR); SAMSUNG SDI CO., LTD., Gyeonggi-do (KR)

(*) Notice: Subject to any disclaimer, the term of this patent is extended or adjusted under 35 U.S.C. 154(b) by 175 days.

(21) Appl. No.: 14/872,251

(22) Filed: Oct. 1, 2015

(65) Prior Publication Data
US 2016/0099463 A1 Apr. 7, 2016

(30) Foreign Application Priority Data

Oct. 2, 2014 (KR) .................. 10-2014-0133555

(51) Int. Cl.
| | |
|---|---|
| H01M 4/36 | (2006.01) |
| H01M 4/133 | (2010.01) |
| H01M 4/134 | (2010.01) |
| H01M 4/131 | (2010.01) |
| H01M 4/38 | (2006.01) |
| H01M 4/46 | (2006.01) |
| H01M 4/485 | (2010.01) |
| H01M 4/139 | (2010.01) |
| H01M 4/587 | (2010.01) |
| H01M 10/052 | (2010.01) |
| H01M 4/02 | (2006.01) |

(52) U.S. Cl.
CPC ........... *H01M 4/364* (2013.01); *H01M 4/131* (2013.01); *H01M 4/133* (2013.01); *H01M 4/134* (2013.01); *H01M 4/139* (2013.01); *H01M 4/38* (2013.01); *H01M 4/386* (2013.01); *H01M 4/387* (2013.01); *H01M 4/463* (2013.01); *H01M 4/485* (2013.01); *H01M 4/587* (2013.01); *H01M 10/052* (2013.01); *H01M 2004/027* (2013.01)

(58) Field of Classification Search
CPC ...... H01M 4/364; H01M 4/131; H01M 4/133; H01M 4/134; H01M 4/139; H01M 4/38; H01M 4/386; H01M 4/387; H01M 4/463; H01M 4/485; H01M 4/587; H01M 10/052; H01M 2004/027
See application file for complete search history.

(56) References Cited

U.S. PATENT DOCUMENTS

| | | |
|---|---|---|
| 5,378,551 A | 1/1995 | Meadows et al. |
| 8,241,793 B2 | 8/2012 | Zhamu et al. |
| 8,753,545 B2 | 6/2014 | Obrovac et al. |
| 8,754,138 B2 | 6/2014 | Michot et al. |
| 2005/0266150 A1 | 12/2005 | Yong et al. |
| 2009/0155692 A1* | 6/2009 | Park ..................... C01G 23/003 429/231.1 |
| 2010/0285358 A1 | 11/2010 | Cui et al. |
| 2010/0288077 A1 | 11/2010 | Le |
| 2011/0081578 A1 | 4/2011 | Chang et al. |
| 2011/0244322 A1* | 10/2011 | Hong ..................... H01M 4/364 429/211 |
| 2012/0100438 A1 | 4/2012 | Fasching et al. |
| 2012/0121977 A1 | 5/2012 | Xu et al. |
| 2012/0302044 A1 | 11/2012 | Haag |
| 2012/0320492 A1 | 12/2012 | Radivojevic et al. |
| 2013/0130115 A1 | 5/2013 | Park et al. |
| 2014/0045028 A1 | 2/2014 | Moon et al. |
| 2014/0050975 A1* | 2/2014 | Cha ....................... H01M 4/364 429/209 |
| 2014/0087255 A1 | 3/2014 | Kim et al. |
| 2015/0147649 A1 | 5/2015 | Jung et al. |
| 2015/0243969 A1 | 8/2015 | Ku et al. |
| 2016/0093879 A1 | 3/2016 | Song et al. |

FOREIGN PATENT DOCUMENTS

| | | |
|---|---|---|
| JP | 11-329429 | * 11/1999 |
| KR | 100404877 B1 | 10/2003 |
| KR | 100878343 B1 | 1/2009 |
| KR | 1020140020376 A | 2/2014 |

OTHER PUBLICATIONS

Translation for JP 11-329429, Nov. 20, 1999.*
Kim et al., "Si-SiC nanocomposite anodes synthesized using high-energy mechanical milling", Journal of Power Sources, vol. 130, 2004, pp. 275-280.
Lee et al., "Fabrication of Si core/C shell nanofibers and their electrochemical performances as a lithium-ion battery anode", Journal of Power Sources, vol. 206, 2012, pp. 267-273.
Xue et al., "CuO/PVDF nanocomposite anode for a piezo-driven self-charging lithium battery", Energy & Environmental Science, vol. 6, 2013, pp. 2615-2620.

(Continued)

Primary Examiner — C Melissa Koslow
(74) Attorney, Agent, or Firm — Cantor Colburn LLP

(57) ABSTRACT

A composite negative active material including a piezoelectric material; and a negative active material. Also a negative electrode including the composite negative active material, and a lithium secondary battery including the negative electrode.

15 Claims, 15 Drawing Sheets
(11 of 15 Drawing Sheet(s) Filed in Color)

(56) References Cited

OTHER PUBLICATIONS

Zhang et al., "First-principles approaches to simulate lithiation in silicon electrodes", Modelling Simul. Mater. Sci. Eng., vol. 21, 2013, pp. 1-29.

Zhang et al., "PVDF-PZT nanocomposite film based self-charging power cell", Nanotechnology, vol. 25, 2014, pp. 1-7.

Extended European Search Report for European Patent Application No. 15187879.0 dated Feb. 17, 2016.

* cited by examiner

COMPOSITE NEGATIVE ACTIVE MATERIAL AND METHOD OF PREPARING THE SAME, NEGATIVE ELECTRODE INCLUDING COMPOSITE NEGATIVE ACTIVE MATERIAL, AND LITHIUM SECONDARY BATTERY INCLUDING NEGATIVE ELECTRODE

CROSS-REFERENCE TO RELATED APPLICATION

This application claims priority to and the benefit of Korean Patent Application No. 10-2014-0133555, filed on Oct. 2, 2014, in the Korean Intellectual Property Office, and all the benefits accruing therefrom under 35 U.S.C. § 119, the content of which is incorporated herein in its entirety by reference.

BACKGROUND

1. Field

This disclosure relates to a composite negative active material, a negative electrode including the composite negative active material, and a lithium secondary battery including the negative electrode.

2. Description of the Related Art

Lithium secondary batteries (also called lithium ion batteries) have been utilized as the primary power source in small electronic products due to their stable charge-discharge behavior and high energy density.

Recently, however, there is a tendency that small mobile electronic products, e.g., smartphones, are equipped with a variety of functions, and have high performance. In addition, the need for large-scale electric power supply sources has significantly increased along with the commercialization of hybrid vehicles or electric vehicles. In order to meet these demands, there is an urgent need for the development of core materials of existing lithium secondary batteries, such as a negative electrode, a positive electrode, a separator, and an electrolyte, in order to significantly improve the performance thereof.

Among these, the development of a novel negative electrode material is very important, since it can result in the development of lithium secondary batteries of high energy density by increasing the specific-capacity of the batteries.

Based on this background, the development of various negative electrode materials, such as silicon, germanium, tin or tin oxide, and iron oxide has continuously been conducted. Among these, silicon materials have been the subject of focused research and development, due to its high theoretical capacity (3580 milliampere-hours per gram, $mAhg^{-1}$ as in the state of $Li_{15}Si_4$).

However, when charging and discharging a battery, a silicon material undergoes volume expansion which runs to 400% of its original volume. The volume expansion induces powdering phenomenon of the electrode material, not only lowering the performance of the electrode, but also causing problems, such as instability due to volume change of the electrode itself. Thus, a silicon material has been added at a level of a trace amount to graphite, which is a conventional negative electrode material.

Therefore, there is a need for a prospective approach to overcome the volume expansion of a silicon material and associated side effects for the development of an electrode having a high energy density.

SUMMARY

Disclosed is a composite negative active material including: a piezoelectric material and a negative active material.

Also disclosed is a negative electrode including the composite negative active material.

Also disclosed is a lithium secondary battery including the negative electrode.

Also disclosed is composite negative active material including: a first phase including a piezoelectric material; and a second phase including a negative active material.

Also disclosed is a method preparing a composite negative active material, the method including: contacting a piezoelectric material and a negative active material to form the composite negative active material. In an embodiment, the negative active material is a non-carbonaceous negative active material, and further comprising including a conductive agent in the contacting.

Additional aspects will be set forth in part in the description which follows and, in part, will be apparent from the description.

According to one or more exemplary embodiments, a composite negative active material includes a piezoelectric material.

The piezoelectric material may include at least one selected from $BaTiO_3$, $PbTiO_3$, $Pb[Zr_xTi_{1-x}]O_3$ (wherein $0 \leq x \leq 1$), $KNbO_3$, $LiNbO_3$, $LiTaO_3$, $Na_2WO_3$, and ZnO.

The amount of the piezoelectric material may be in a range of about 1 wt % to about 90 wt %, based on a total weight of the composite negative active material.

The composite negative active material may include a non-carbonaceous negative active material having a maximum volume expansion of about 10% or more during an electrochemical reaction.

The non-carbonaceous negative active material may have a maximum volume expansion of about 50% or more during an electrochemical reaction.

The non-carbonaceous negative active material may have a maximum volume expansion of about 300% or more during an electrochemical reaction.

The non-carbonaceous negative active material may include at least one selected from silicon, germanium, aluminum, tin, a titanium oxide, and a lithium titanium oxide.

The amount of the non-carbonaceous negative active material may be in a range of about 1 wt % to about 90 wt %, based on a total weight of the composite negative active material.

The composite negative active material may further include a carbonaceous negative active material.

The carbonaceous negative active material may include at least one selected from carbon nanotubes, graphite, graphene, carbon black, and a carbonized polymer.

The amount of the carbonaceous negative active material may be in a range of about 1 wt % to about 95 wt %, based on a total weight of the composite negative active material.

According to one or more exemplary embodiments, a negative electrode includes the composite negative active material.

According to one or more exemplary embodiments, a lithium secondary battery includes the negative electrode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1:
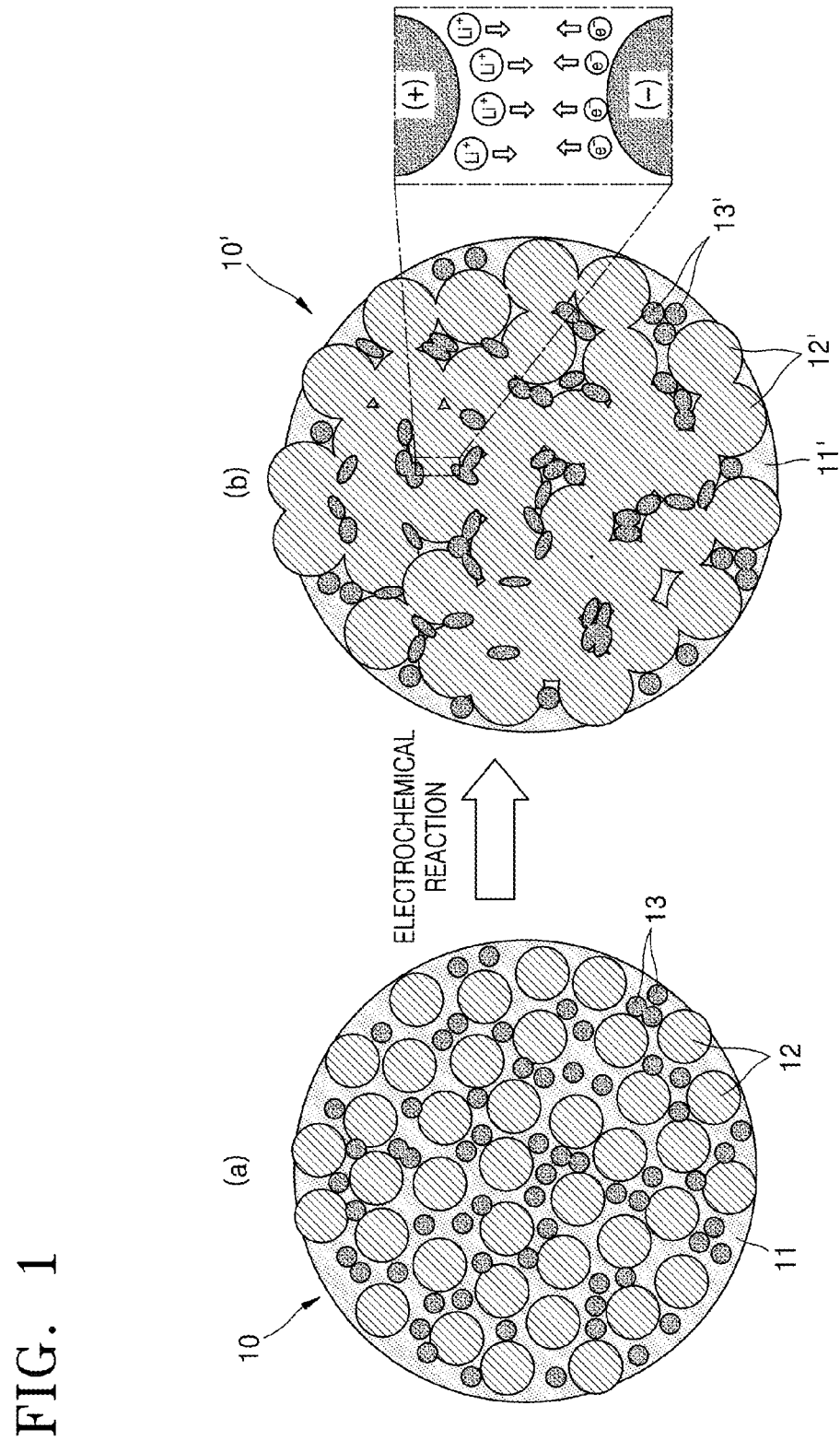
FIG. 1 is a conceptual view illustrating an embodiment of an operating principle of a composite negative active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. "Or" means "and/or." Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite negative active material, a negative electrode, and a lithium secondary battery according to an embodiment are disclosed in further detail.

The composite negative active material according to an exemplary embodiment includes a piezoelectric material and a negative active material.

As used herein, "a composite negative active material" refers to a negative active material which comprises two or more constituent materials with significantly different physical or chemical properties that, when combined, produce a material with characteristics different from the individual components. The individual components remain separate and distinct within the finished structure.

As used herein, "a piezoelectric material" refers to a material capable of generating an internal electrical charge when a mechanical force is applied to the material and vice versa, that is, a material capable of generating internal mechanical strain when an electric field is applied to the material.

The negative active material may comprise at least one of a non-carbonaceous negative active material and/or a carbonaceous negative active material. When the composite negative active material (e.g., a non-carbonaceous negative active material and/or a carbonaceous negative active material) is expanded during an electrochemical reaction, a mechanical force may be applied to the piezoelectric material, generating an internal electrical charge. This results in a local potential difference in the composite negative active material, thereby reducing resistance in the composite negative active material, which increases the mobility of lithium ions and electrons.

The piezoelectric material may be a ceramic piezoelectric material.

The piezoelectric material may include at least one selected from $BaTiO_3$, $PbTiO_3$, $Pb[Zr_xTi_{1-x}]O_3$ (wherein $0 \leq x \leq 1$), $KNbO_3$, $LiNbO_3$, $LiTaO_3$, $Na_2WO_3$, and $ZnO$.

The amount of the piezoelectric material may be in a range of about 1 weight percent (wt %) to about 90 wt %, about 2 wt % to about 80 wt %, or about 4 wt % to about 70 wt %, based on a total weight of the composite negative active material. When the amount of the ceramic piezoelectric material is within the above range, a suitable amount of active material components may be maintained while a suitable piezoelectric effect may be provided so that a desirable capacity may be provided.

The composite negative active material may further include a non-carbonaceous negative active material having a maximum volume expansion of about 10% or more, e.g., about 10% to about 100%, about 15% to about 80%, or about 20% to about 60%, during an electrochemical reaction.

Lithium ions may be intercalated into or deintercalated from the non-carbonaceous negative active material during an electrochemical reaction.

The non-carbonaceous negative active material may be crystalline. However, the crystalline non-carbonaceous negative active material may convert into an amorphous state after intercalation of lithium ions into the non-carbonaceous negative active material, and the amorphous non-carbonaceous negative active material may convert into a crystalline state after deintercalation of lithium ions from the amorphous non-carbonaceous negative active material.

The non-carbonaceous negative active material may have a high theoretical capacity. Accordingly, a lithium secondary battery including the non-carbonaceous negative active material may have high specific-capacity and thus high energy density.

The non-carbonaceous negative active material may include at least one selected from silicon, germanium, aluminum, tin, a titanium oxide, and a lithium titanium oxide.

In the present specification, "a maximum volume expansion rate" may be calculated by the following Equation 1.

$$\text{Maximum Volume Expansion (\%)} = V_f/V_i \times 100 \qquad \text{Equation 1}$$

In Equation 1, $V_f$ indicates a volume of the negative active material, which can be a non-carbonaceous negative active material or a carbonaceous negative active material, wherein the volume is measured when a full intercalation of lithium ions into the negative active material has occurred during an electrochemical reaction, as may occur during operation of a lithium secondary battery that includes a negative electrode containing the composite negative active material. For example, in the case that the non-carbonaceous negative active material is silicon (Si), germanium (Ge), aluminum (Al), or tin (Sn), when a full intercalation of lithium ion into the non-carbonaceous negative active material has occurred, the non-carbonaceous negative active material may have a Formula of $Li_{22}Si_5$, $Li_{22}Ge_5$, AlLi, or $Li_{22}Sn_5$, respectively.

$V_i$ indicates a volume of the negative active material, e.g., a non-carbonaceous negative active material or a carbonaceous negative active material, measured before an electrochemical reaction has occurred (e.g., before intercalation of lithium ions).

The non-carbonaceous negative active material may have a maximum volume expansion of about 50% or more, 70% or more, 90% or more, 100% or more, 150% or more, 200% or more, 250% or more, 300% or more, or 350% or more, or about 50% to about 1000%, about 75% to about 900%, or about 100% to about 800%, during an electrochemical reaction.

In some embodiments, the non-carbonaceous negative active material may have a maximum volume expansion of about 1,000% or less or 400% or less during an electrochemical reaction.

The amount of the non-carbonaceous negative active material may be in a range of about 1 wt % to about 90 wt %, about 2 wt % to about 80 wt %, about 4 wt % to about 70 wt %, based on a total weight of the composite negative active material. When the amount of the non-carbonaceous negative active material is within this range, the effects of considerably increasing capacity may be obtained, and an excessive volume expansion may be suppressed, and thus excellent battery performance may be maintained.

The composite negative active material may further include a carbonaceous negative active material.

Lithium ions may be intercalated into or deintercalated from the carbonaceous negative active material during an electrochemical reaction. The carbonaceous negative active material may also serve as a binder.

The carbonaceous negative active material may have a low theoretical capacity and/or a low maximum volume expansion compared to the non-carbonaceous negative active material.

The carbonaceous negative active material may include at least one selected from carbon nanotubes, graphite, graphene, carbon black, and a carbonized polymer. The carbon nanotubes may include single-wall carbon nanotubes, multi-wall carbon nanotubes, or a mixture thereof.

The amount of the carbonaceous negative active material may be in a range of about 1 wt % to about 95 wt %, about 2 wt % to about 85 wt %, about 4 wt % to about 75 wt %, based on a total weight of the composite negative active material. When the amount of the carbonaceous negative active material is within this range, passages for migration of lithium ions may be sufficiently secured during an electrochemical reaction and the effect of substantial improvement in battery performance may be obtained.

In the composite negative active material each of the piezoelectric material, the non-carbonaceous negative active material (if present), and the carbonaceous negative active material (if present) may be a distinct phase. The presence of distinct crystallographic phases can be determined by X-ray diffraction (XRD). Thus the composite negative active material may comprise a first phase, wherein the first phase is a piezoelectric material, a second phase, wherein the second phase is a negative active material. The composite negative active material may further comprise a third phase, which is different than the second phase, and may be a non-carbonaceous negative active material or a carbonaceous negative active material.

The composite negative active material may include the piezoelectric material, the non-carbonaceous negative active material, and the carbonaceous negative active material. The piezoelectric material is contained in an amount of about 4 weight percent to about 70 weight percent, the non-carbonaceous negative active material is contained in an amount of about 4 weight percent to about 70 weight percent, and the carbonaceous negative active material is contained in an amount of about 4 weight percent to about 75 weight percent, each based on a total weight of the composite negative active material.

Hereinafter an operating principle of a composite negative active material 10, a lithiated composite negative active material 10' including a piezoelectric material 13, piezoelectric material 13', a non-carbonaceous negative active material 12, a lithiated non-carbonaceous negative active material 12', a carbonaceous negative active material 11, and a lithiated carbonaceous negative active material 11' will be described in further detail with reference to FIG. 1.

FIG. 1 (a) is a conceptual view illustrating the composite negative active material 10 before an occurrence of an electrochemical reaction, and FIG. 1 (b) is a conceptual view illustrating the lithiated composite negative active material 10' after an occurrence of an electrochemical reaction.

Referring to FIG. 1 (a), the composite negative active material 10 includes a piezoelectric material 13, a non-carbonaceous negative active material 12, and a carbonaceous negative active material 11. The non-carbonaceous negative active material 12 may be crystalline.

Referring to FIG. 1 (b), the lithiated composite negative active material 10' after an electrochemical reaction includes a piezoelectric material 13', a lithiated non-carbonaceous negative active material 12', and a lithiated carbonaceous negative active material 11'. The lithiated non-carbonaceous negative active material 12' may be amorphous.

Referring to FIG. 1, the non-carbonaceous negative active material 12 is expanded due to intercalation of lithium ions induced by an electrochemical reaction, resulting in forming a lithiated form of the non-carbonaceous negative active material (referred to as a lithiated non-carbonaceous negative active material 12'). In addition, the carbonaceous negative active material 11 is expanded due to intercalation of lithium ions induced by an electrochemical reaction, resulting in forming a lithiated form of the carbonaceous negative active material (referred to as a lithiated carbonaceous negative active material 11'). In addition, as such, and while not wanting to be bound by theory, the lithiated non-carbonaceous negative active material 12' and/or the lithiated carbonaceous negative active material 11', which are expanded by an electrochemical reaction, may pressurize the piezoelectric material 13' therein and then deform the piezoelectric material 13' to generate electrical charges inside the piezoelectric material 13'. Accordingly, even when the composite negative active material 10 turns into the lithiated composite negative active material 10' of which volume is expanded due to an electrochemical reaction, the lithiated composite negative active material 10' may have an excellent mobility of lithium ions and electrons due to a decrease of its resistance.

Hereinafter a method of preparing the composite negative active material 10 including the piezoelectric material 13, the non-carbonaceous negative active material 12, and the carbonaceous negative active material 11, and deformation of the non-carbonaceous negative active material 12 and the piezoelectric material 13 into the lithiated non-carbonaceous negative active material 12' and the piezoelectric material 13', respectively, during an electrochemical reaction, and associated effects will be described in further detail with reference to FIG. 2.

First, the piezoelectric material 13, which may be in a form of a powder, the non-carbonaceous negative active material 12, which may also be in the form of a powder, and the carbonaceous negative active material 11, which may also be in the form of a powder, may be dry-mixed to cause complexation therebetween to prepare the composite negative active material 10.

Figure 3:
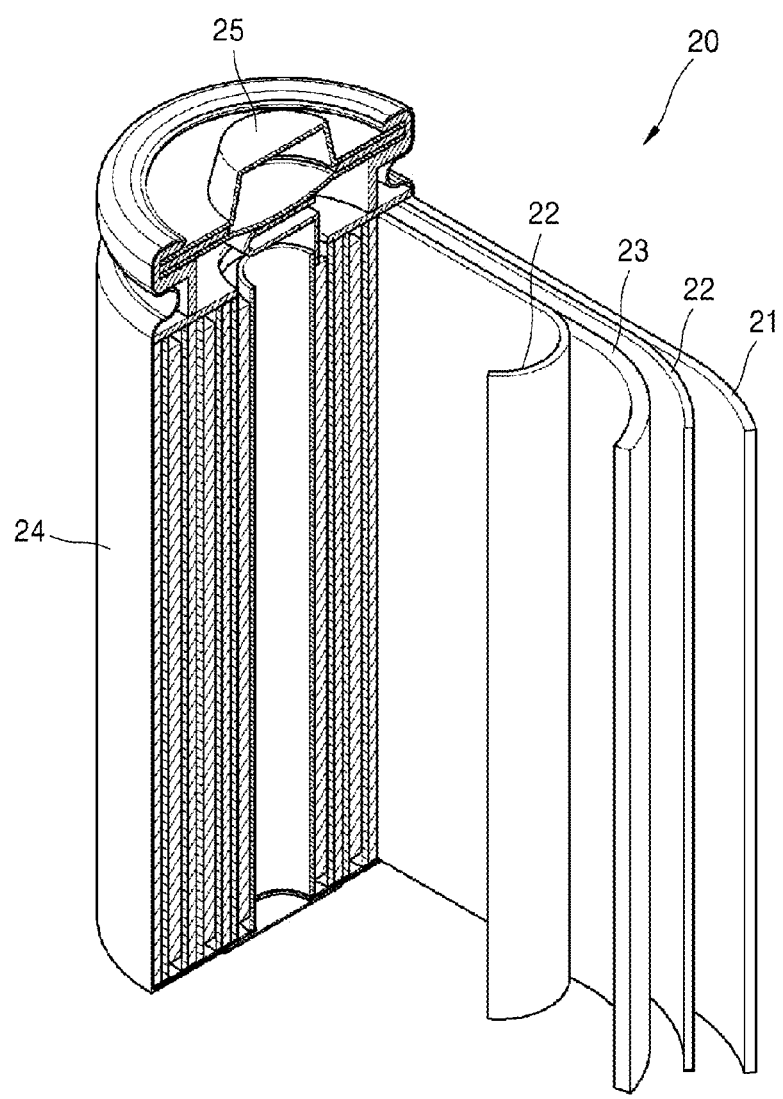
FIG. 3 is a schematic view illustrating an embodiment of a lithium secondary battery.

Then, a negative electrode 21 (an embodiment of which is shown in FIG. 3) including the prepared composite negative active material 10 may be prepared. Then, a lithium secondary battery 20 (an embodiment of which is shown in FIG. 3) including the negative electrode may be prepared.

Then, the lithium secondary battery may be operated so as to induce an electrochemical reaction, which results in intercalation of lithium ions, i.e., lithiation, into the non-carbonaceous negative active material 12, e.g., Si. The non-carbonaceous negative active material 12 may thus be expanded to form the lithiated non-carbonaceous negative active material 12', e.g., $Li_xSi$ (wherein $3.5 < x \leq 4.4$). The piezoelectric material 13 may be deformed by mechanical stress applied by the lithiated non-carbonaceous negative active material 12', turning into the mechanically stressed piezoelectric material 13'. The piezoelectric material 13' may exhibit a piezoelectric effect, generating internal electrical charges. That is, the piezoelectric material 13 takes compressive stress during the process of deformation from the piezoelectric material 13 to piezoelectric material 13', thereby generating piezoelectricity.

Figure 2:
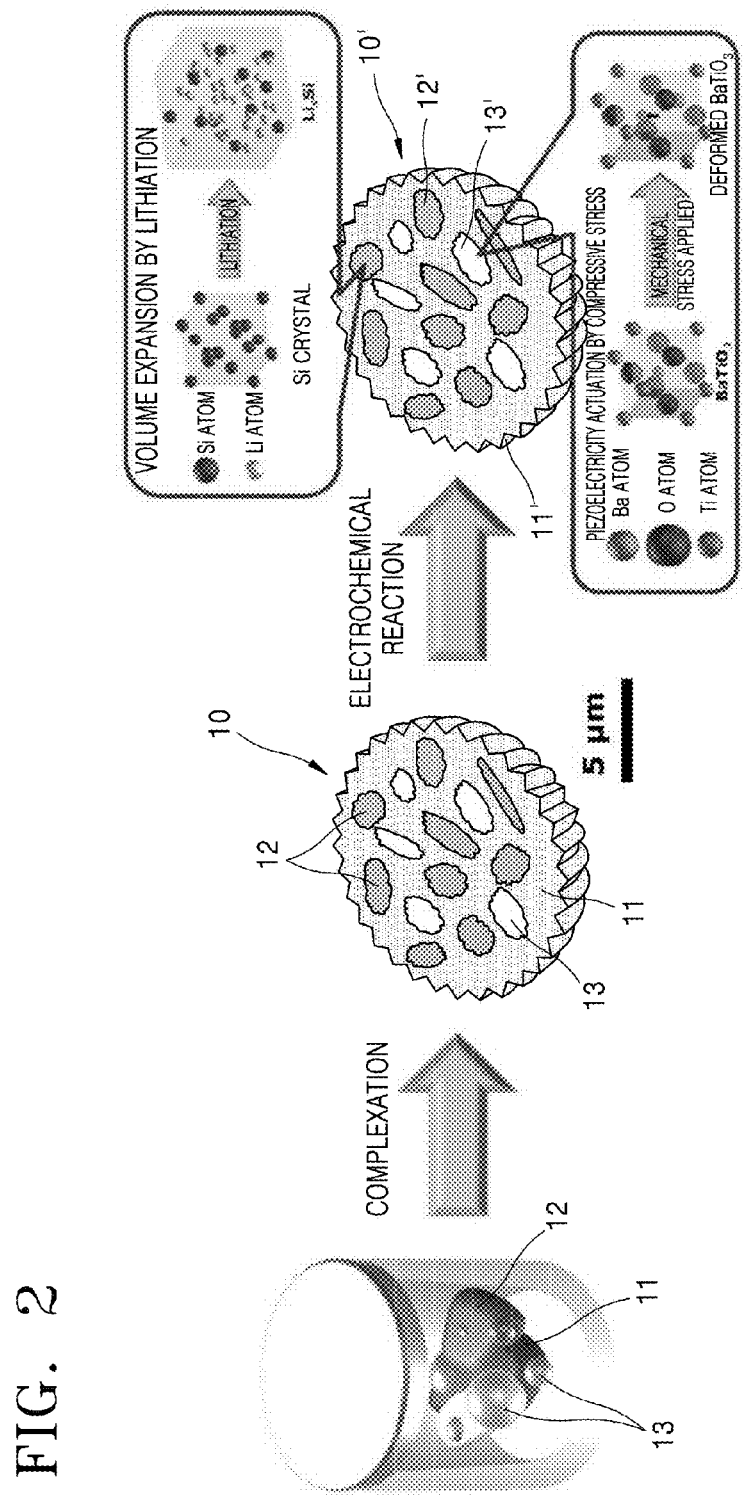
FIG. 2 is a conceptual view illustrating an embodiment of a method of preparing the composite negative active material, and deformation of a non-carbonaceous negative active material and a piezoelectric material during an electrochemical reaction, and associated effects.

As for an example of the piezoelectric material 13 barium titanate ($BaTiO_3$) is shown in FIG. 2, but embodiments are not limited thereto.

A negative electrode according to an embodiment may include the composite negative active material.

The negative electrode may further include other negative active materials suitable for use in a lithium secondary battery other than the composite negative active material. Examples of the other negative active materials may include a carbonaceous material, such as carbon or graphite capable of intercalation and deintercalation of lithium ions, which is identical to or different from the graphite described above; a lithium metal; a lithium metal alloy; and a silicon oxide-based material.

The negative electrode may additionally include a binder and/or a conductive agent other than the composite negative active material disclosed above and other negative active materials.

The binder may facilitate binding between components of the negative electrode, such as the composite negative active material, the other negative active materials, and the conductive agent and binding of the negative electrode to a current collector. Examples of the binder include at least one of polyacrylic acid (PAA), polyvinylidene difluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer (EPDM), sulfonated EPDM, styrene-butadiene-rubber, fluorinated rubber, or a copolymer thereof.

The binder may include lithium ions.

The amount of the binder may be in a range of about 1 part by weight to about 10 parts by weight, for example, in a range of about 2 parts by weight to about 7 parts by weight, based on 100 parts by weight of a total weight of the composite negative active material and the other negative active materials. When the amount of the binder is in the range above, e.g., about 1 part by weight to about 10 parts by weight, the binding force of the negative electrode to the current collector may be suitably strong.

The conductive agent is not particularly limited as long as the conductive agent has conductivity and does not induce an undesirable chemical change in the lithium secondary battery including the conductive agent.

The conductive agent may include, for example, at least one carbonaceous conductive agent selected from carbon black, carbon fiber, and graphite, which may be identical to or different from the graphite described above. The carbon black may be, for example, acetylene black, Ketjen black, Super P carbon, channel black, furnace black, lamp black, or thermal black. The graphite may be natural graphite or artificial graphite.

The negative electrode may additionally include other conductive agent other than the carbonaceous conductive agent described above.

The other conductive agent may be selected from an electrically conductive fiber, such as a metal fiber; a metal powder, such as an aluminum powder or a nickel powder; a conductive whisker, such as a zinc oxide or a potassium titanate; and a polyphenylene derivative.

The composite negative active material may serve as an active material, and also a conductive agent due to inclusion of the carbonaceous negative active material. Thus, the amount of the conductive agent in the composite negative active material may be less than the amount of a conductive agent in a conventional negative active material. The amount of the conductive agent may be in a range of about 0.01 part by weight to about 10 parts by weight, for example, in a range of about 0.5 parts by weight to about 5 parts by weight, based on 100 parts by weight of a total weight of the composite negative active material and the other negative active materials. When the amount of the conductive agent is within the range above, e.g., about 0.01 parts by weight to about 10 parts by weight, a negative electrode having excellent ion conductivity may be obtained.

Hereinafter a method of manufacturing the negative electrode will be described in further detail.

First, the composite negative active material according to an embodiment, the other negative active materials (if desired), the binder, a solvent, the carbonaceous conductive agent, and/or the other conductive agent may be mixed to prepare a composition for forming a negative active material layer.

Then, a negative electrode current collector may be coated with the composition for forming a negative active material layer and dried to thereby manufacture a negative electrode.

The thickness of the negative current collector may be in a range of about 3 micrometers (μm) to about 500 μm. A material for the negative electrode current collector is not particularly limited as long as the material has suitable electrical conductivity while not causing a chemical change in the lithium secondary battery. Examples of the material for the negative electrode current collector include copper; stainless steel; aluminum; nickel; titanium; heat-treated carbon; copper or stainless steel that is surface-treated with carbon, nickel, titanium, or silver; and an aluminum-cadmium alloy. Also, as well as a positive electrode current collector, a surface roughness may be formed on a surface of the negative electrode current collector to enhance binding force of the negative active material to the negative electrode current collector. The negative electrode current collector may be used in various forms including films, sheets, foils, nets, porous structures, foams, and non-woven fabrics.

Examples of the solvent include, but not limited to, N-methylpyrrolidone (NMP), acetone, water or a mixture thereof. The amount of the solvent may be in a range of about 1 part by weight to about 80 parts by weight, based on 100 parts by weight of a total weight of the composite negative active material and the other negative active material. When the amount of the solvent is within the above described range, a forming an active material layer may be facilitated.

A lithium secondary battery according to an embodiment includes the negative electrode.

FIG. 3 is a schematic view illustrating an embodiment of a lithium secondary battery 20.

Referring to FIG. 3, a lithium secondary battery 20 includes a positive electrode 23, a negative electrode 21, and a separator 22.

The positive electrode 23, the negative electrode 21, and the separator 22 may be wound or folded to be accommodated in a battery case 24. Then, an electrolyte (not shown) may be injected to the battery case 24, and the battery case may be sealed by a cap assembly 25, thereby manufacturing a lithium secondary battery 20. The battery case 24 may be a cylindrical type, a rectangular type, or a thin-film type. For example, the lithium secondary battery 20 may be a large thin-film type battery.

The lithium secondary battery has improved capacity characteristics as well as improved lifespan and high rate discharge characteristics. As used herein, the term "high rate discharge characteristics" refers to a ratio of an actual discharged capacity of a 100% charged cell when the cell is discharged completely with a current discharging all of the cell capacity in less than 10 hour period with respect to an actual discharged capacity of the 100% charged cell when the cell is discharged completely with a current discharging all of the cell capacity during a 10 hour period.

As used herein, the term "discharge" refers to a process of deintercalation of lithium ions from a negative electrode, and the term "charge" refers to a process of intercalation of lithium ions into a negative electrode.

Hereinafter a method of manufacturing a lithium secondary battery according to an exemplary embodiment will be described in further detail.

First, a negative electrode may be manufactured following the method described above.

Then, a positive electrode may be manufactured following a method similar with the method of manufacturing the negative electrode. For example, a lithium transition metal oxide, a binder, a conductive agent, and a solvent may be mixed to prepare a composition for forming a positive electrode active material layer. Then, a positive electrode current collector may be coated with the composition for forming a positive electrode active material layer and dried to thereby manufacture a positive electrode.

The types and the amounts of the binder, the conductive agent, and the solvent used to prepare the composition for forming the positive active material layer may be the same as those for preparing the composition for forming the negative active material layer.

The lithium transition metal oxide may include at least one selected from $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (wherein $0 \leq Y<1$), $LiMn_{2-z}Ni_zO_4$, $LiMn_{2-z}Co_zO_4$ (wherein $0<Z<2$), $LiCoPO_4$, and $LiFePO_4$.

A thickness of the positive current collector may be in a range of about 3 μm to about 500 μm. The positive current collector is not particularly limited as long as the current collector has sufficient electrical conductivity and does not induce an undesirable chemical change in the lithium secondary battery including the positive current collector. Examples of the positive electrode current collector may include stainless steel; aluminum; nickel; titanium; heat-treated carbon; and aluminum or stainless steel that is surface-treated with carbon, nickel, titanium, or silver. In addition, the positive electrode current collector may be processed to have a surface roughness on surfaces thereof so as to enhance binding force of the positive active material to the positive electrode current collector, and may be used in various forms including films, sheets, foils, nets, porous structures, foams, and non-woven fabrics.

The lithium secondary battery may be manufactured by disposing a separator between the positive electrode and the negative electrode and supplying an organic liquid electrolyte thereto.

The lithium secondary battery may be manufactured by, for example, sequentially stacking the negative electrode, the separator, and the positive electrode; winding or folding the stacked structure, then enclosing the wound or folded structure in a cylindrical or rectangular battery case or a pouch; and then injecting the organic liquid electrolyte to the battery case or the pouch.

A pore diameter of the separator may be in a range of about 0.01 μm to about 10 μm, and a thickness of the separator may be in a range of about 5 μm to about 300 μm. In particular, the separator may be formed of, for example, an olefin-based polymer, such as polypropylene or polyethylene; or a sheet or non-woven fabric formed of glass fibers.

The organic liquid electrolyte may be prepared by dissolving a lithium salt in an organic solvent.

The organic solvent may be at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolan, N-dimethylformamide, dimethylacetamide, dimethylsulfoxide, dioxane, 1,2-dimethoxyethane, sulfolane, dichloroethane, chlorobenzene, nitrobenzene, diethylene glycol, and dimethylether.

The lithium salt may be at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ wherein, x and y are natural numbers, LiCl, and LiI.

In a lithium secondary battery according to another embodiment, an organic solid electrolyte and/or an inorganic solid electrolyte may be used in combination with the organic liquid electrolyte. When the organic solid electrolyte and/or the inorganic solid electrolyte are used, the organic solid electrolyte and/or inorganic solid electrolyte may serve as a separator in some cases, and thus, the separator described above may be omitted if desired.

Examples of the organic solid electrolyte may include at least one of a polyethylene derivative, a polyethylene oxide derivative, a polypropylene oxide derivative, a phosphate ester polymer, a polyester sulfide, a polyvinyl alcohol, and a polyvinylidene difluoride.

Examples of the inorganic solid electrolyte may include at least one of $Li_4SiO_4$, and a lithium nitride, halide and sulfide, such as $Li_3N$, LiI, $Li_5NI_2$, $Li_3N$—LiI—LiOH, $Li_2SiS_3$, $Li_4SiO_4$—LiI—LiOH, $Li_3PO_4$—$Li_2S$—$SiS_2$.

The composite negative active material will now be described in greater detail with reference to the following examples. However, the following examples are for illustrative purposes only and shall not limit the scope of this disclosure.

EXAMPLES

Example 1: Preparation of Composite Negative Active Material Including a Piezoelectric Material Silicon nanopowder (SiNP, available from Kojundo Co., Ltd.), multi-walled carbon nanotubes (available from CNT Co., Ltd.) and barium titanate ($BaTiO_3$, available from Aldrich Co., Ltd.) nanoparticles were mixed at a weight ratio of about 49:21:30. Then, milling was performed thereon with a high-energy ball mill (available from Spex Col., Ltd.) for about an hour, thereby completing the preparation of a composite negative active material.

Comparative Example 1: Preparation of Composite Negative Active Material not Including the Piezoelectric Material Silicon nanopowder (SiNP, available from Kojundo Co., Ltd.) and multi-walled carbon nanotubes (available from CNT Co., Ltd.) were mixed at a weight ratio of about 7:3. Then, milling was performed thereon with a high-energy ball mill (available from Spex Col., Ltd.) for about an hour, thereby completing the preparation of a composite negative active material.

Example 2 and Comparative Example 2: Manufacture of Negative Electrode and Coin Half-Cell The prepared composite negative active material and a binder solution (that is, a 4 volume % Li-PAA solution prepared by dissolving polyacrylic acid (PAA, Aldrich) in water to obtain an aqueous PAA solution and adding LiOH to the aqueous PAA solution) were mixed at a weight ratio of about 9:1 to prepare a slurry for forming a negative active material layer. Then, a thin film of copper, which was a negative electrode current collector, having a thickness of about 15 micrometers (μm) was coated with the slurry for forming a negative active material layer in a bar coating method to have a thickness of about 45 μm. Then, the coated thin film of copper was primary-dried at 80° C., roll-pressed, secondary-dried at 120° C. under a vacuum atmosphere, and punched, thereby completing a manufacture of a negative electrode.

Then, the negative electrode was wound to form a round shape having a diameter of about 12 millimeters (mm), lithium metal was used as a counter electrode, and Star20 separator from Asahi Kasei was used as a separator, thereby completing the manufacture of a 2032 type coin half-cell. Here, a 1.3 molar (M) $LiPF_6$ solution was used as an organic liquid electrolyte that was dissolved in a mixed solvent, wherein the mixed solvent was a mixture of ethylene carbonate, diethyl carbonate, and fluoroethylene carbonate at a weight ratio of about 2:6:2.

Evaluation Examples

Figure 4A:
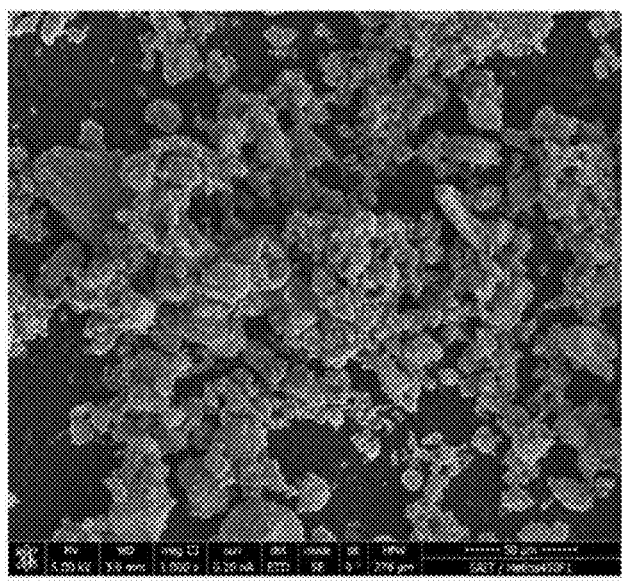
FIG. 4A to FIG. 4D are a scanning transmission electron microscope (STEM) images of a composite negative active material prepared in Example 1.
Figure 4B:
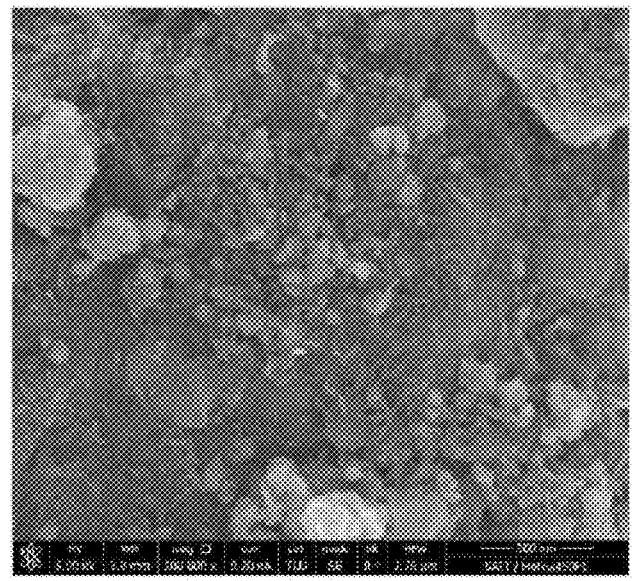
Figure 4C:
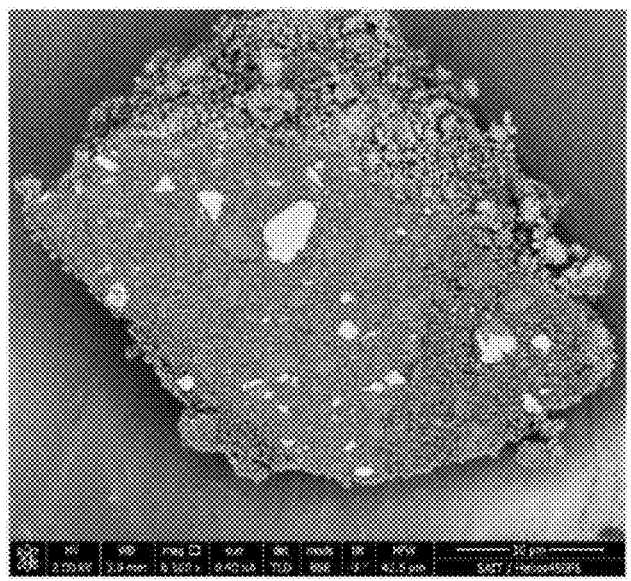
Figure 4D:
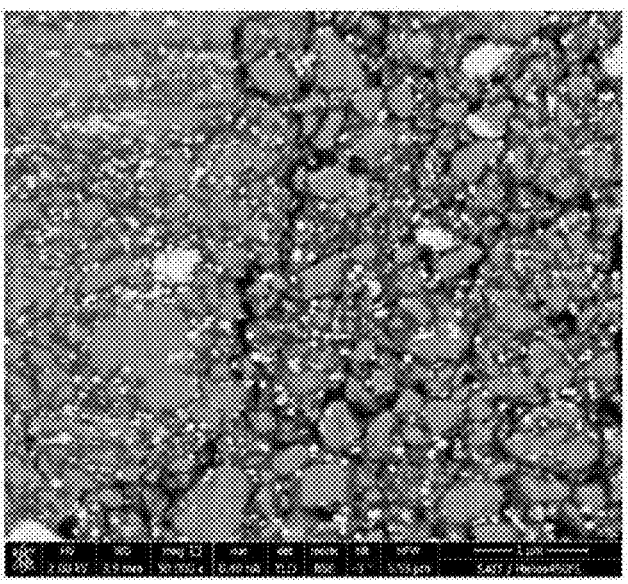

Evaluation Example 1: Analysis of Scanning Transmission Electron Microscope (STEM) Image of Composite Negative Active Material A STEM image of the composite negative active material prepared in Example 1 was taken by using a SEM-FIB system (FEI, Helios 450F1) and shown in FIGS. 4A to 4D. FIG. 4A is a STEM image of an outer surface of the composite negative active material prepared in Example 1, and FIG. 4B is an enlarged image of FIG. 4A. FIG. 4C is a STEM image of a cross section of the composite negative active material prepared in Example 1, and FIG. 4D is an enlarged image of FIG. 4C.

Referring to FIGS. 4A to 4D, it was found that components of the composite negative active material prepared in Example 1 had a homogeneous distribution.

Evaluation Example 2: Analysis of EDS Mapping Image and SEM Image of Composite Negative Active Material An EDS Mapping image and a SEM image of the composite negative active material prepared in Example 1 was analyzed by EDS Mapping, SEM, an energy dispersive X-ray spectrometry (Bruker, D8 Advance), and Raman spectroscopy (micro-Raman_K, inVia), the results of which are shown in FIGS. 5A to 5G.

Figure 5A:
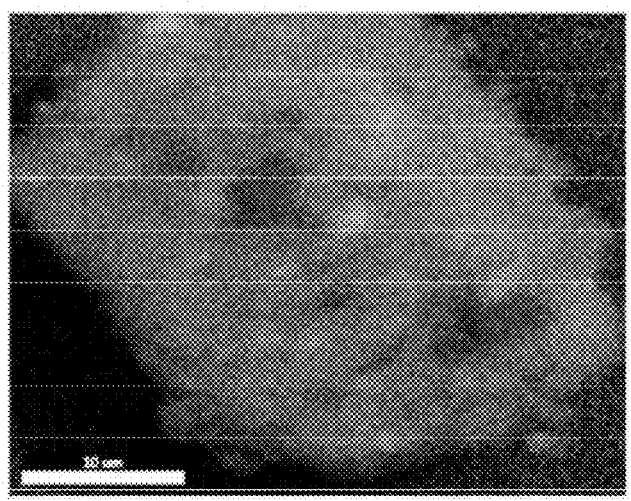
FIG. 5A to FIG. 5G are EDS Mapping images and a scanning electron microscope (SEM) images of the composite negative active material prepared in Example 1.
Figure 5B:
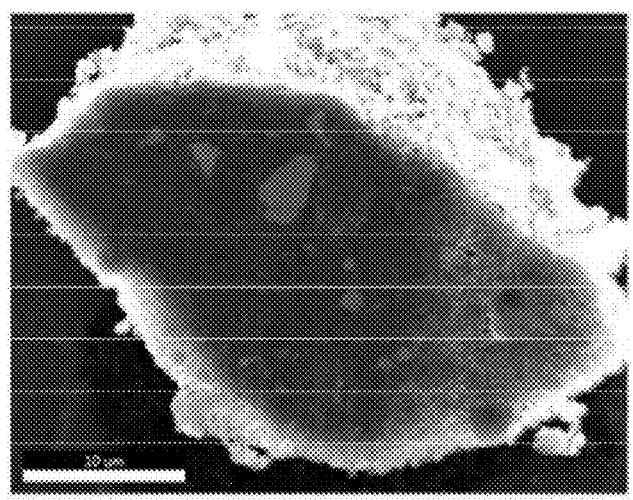
Figure 5C:
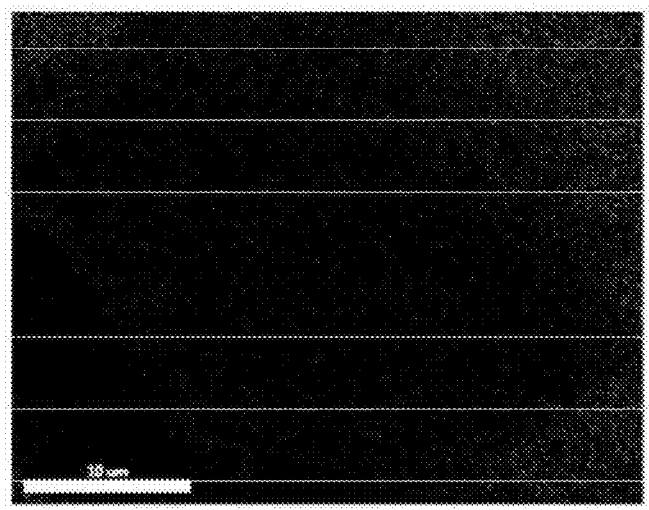
Figure 5D:
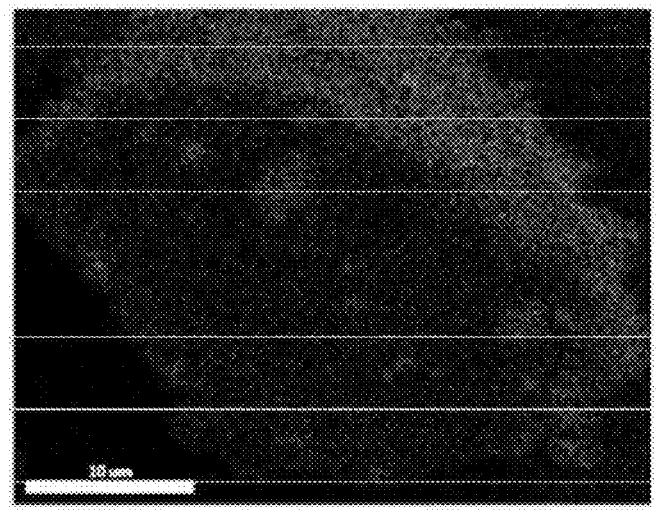
Figure 5E:
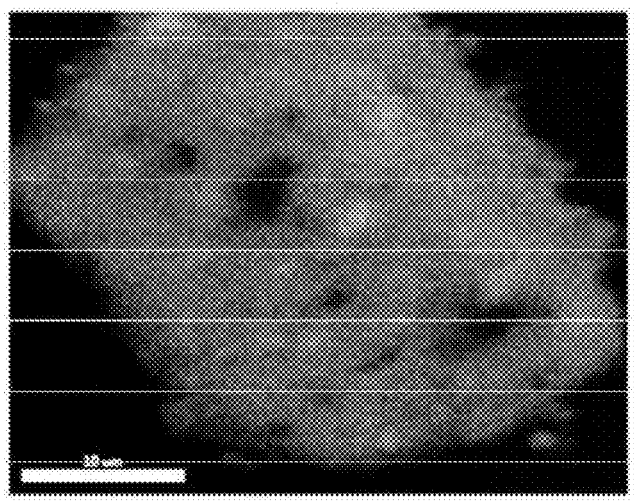
Figure 5F:
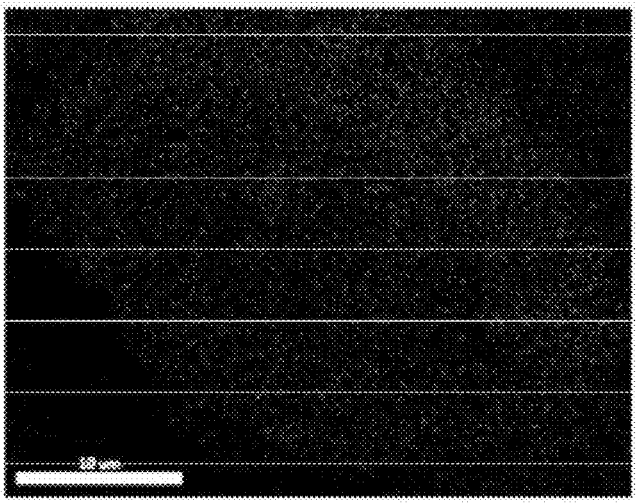
Figure 5G:
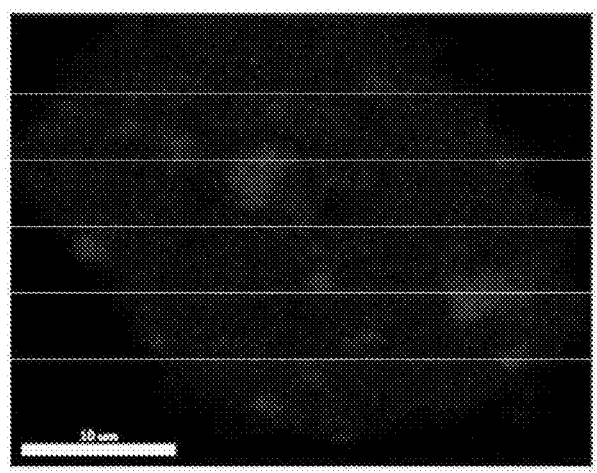

FIG. 5A is an EDS map of an outer surface of the composite negative active material prepared in Example 1, FIG. 5B is a SEM image of an outer surface of the composite negative active material prepared in Example 1, FIG. 5C is an EDS map of carbon included in the composite negative active material prepared in Example 1, FIG. 5D is an EDS map of oxygen included in the composite negative active material prepared in Example 1, FIG. 5E is an EDS map of silicon included in the composite negative active material prepared in Example 1, FIG. 5F is an EDS map of titanium included in the composite negative active material prepared in Example 1, and FIG. 5G is an EDS Mapping image of barium included in the composite negative active material prepared in Example 1.

Referring to FIGS. 5A to 5G, it was found that components of the composite negative active material prepared in Example 1 had a homogeneous distribution.

Evaluation Example 3: Analysis of XRD Pattern of Composite Negative Active Material XRD pattern of the composite negative active material prepared in Example 1 were analyzed by using a Rigaku RINT2200HF+ diffractometer using an X-ray diffraction spectrometer (Cu Kα radiation 1.540598 Å). The results thereof are shown in FIG. 6.

Figure 6:
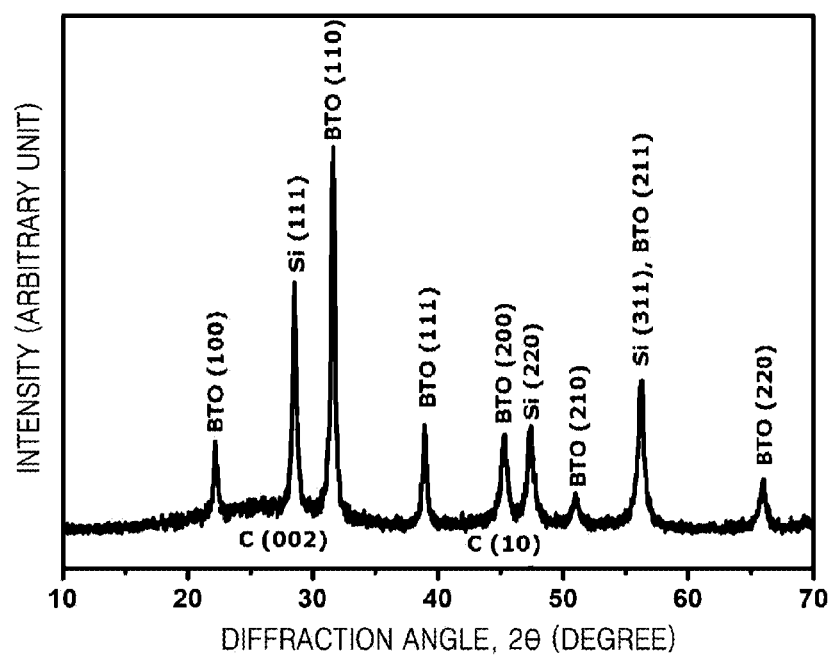
FIG. 6 is a graph of intensity (arbitrary units) versus diffraction angle (2θ, degrees) and is an X-ray diffraction (XRD) spectrum of the composite negative active material prepared in Example 1.

Referring to FIG. 6, it was found that silicon (Si) crystal and barium titanate (BTO) crystal were each independently formed in the composite negative active material prepared in Example 1.

Evaluation Example 4: Raman Analysis of Composite Negative Active Material

Raman spectrum of the composite negative active material prepared in Example 1 was measured by using a Raman spectrophotometer (Tokyo Instrument Inc, Nanofinder 30). The results thereof are shown in FIG. 7.

Figure 7:
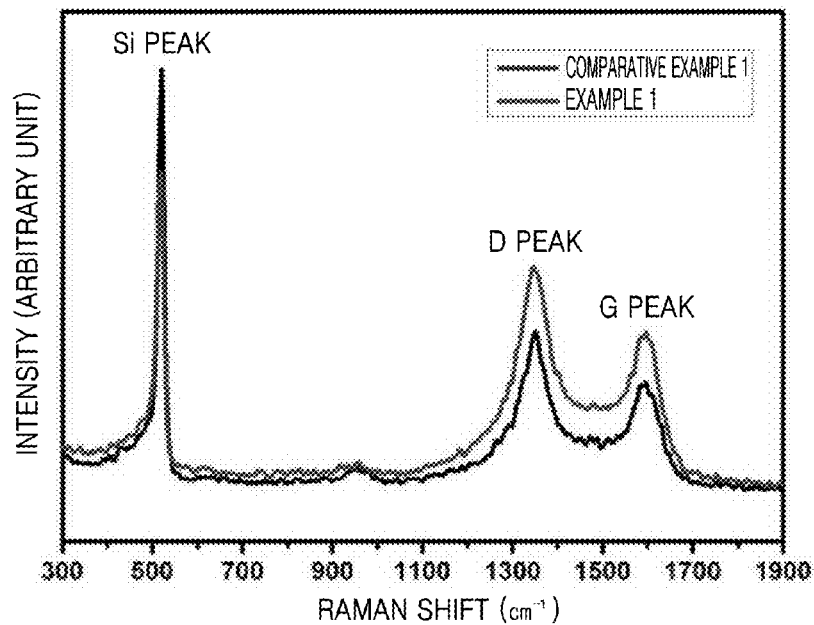
FIG. 7 is a graph of intensity (arbitrary units) versus Raman shift (wavenumbers, $cm^{-1}$) and is a Raman spectrum of the composite negative active material prepared in Example 1.

Referring to FIG. 7, it was found that the composite negative active material prepared in Example 1 exhibited typical Raman spectrum characteristic peaks of silicon and carbon, that is, a silicon peak and a carbon peak (a D peak and a G peak). For reference, barium titanate is typically not detected in the case of Raman analysis.

Evaluation Example 5: Evaluation of Charge/Discharge Characteristics

Charge and discharge characteristics of the coin half cells prepared in Example 2 and Comparative Example 2 were evaluated by using a charger and discharger (TOYO-3100, available from: TOYO SYSTEM Co. Ltd.). In greater detail, in the first cycle (n=1), each coin half-cell was charged at a C-rate of about 0.2 C (unit: mA/g) at a room temperature of about 25° C. until a voltage of about 0.01 V was reached. Then, each coin half-cell was discharged at a C-rate of about 0.2 C until a voltage of about 1.5 V was reached. Thereafter, each of the coin half cells was rested for about 10 minutes. Subsequently, in the second and the following cycles (n≥2) each of the coin half-cells was charged at a C-rate of 0.5 C at room temperature of about 25° C. until a voltage of 0.01 V was reached. Then each coin half-cell was discharged at a C-rate of about 0.5 C until the voltage of about 1.5 V was reached. The charge and discharge cycle described above was repeated 20 times (that is, n=20). The letter "C" denotes a discharge rate, which is a value obtained by dividing the total capacity of the cell by the total discharge time.

Voltage Profile Evaluation

Figure 8:
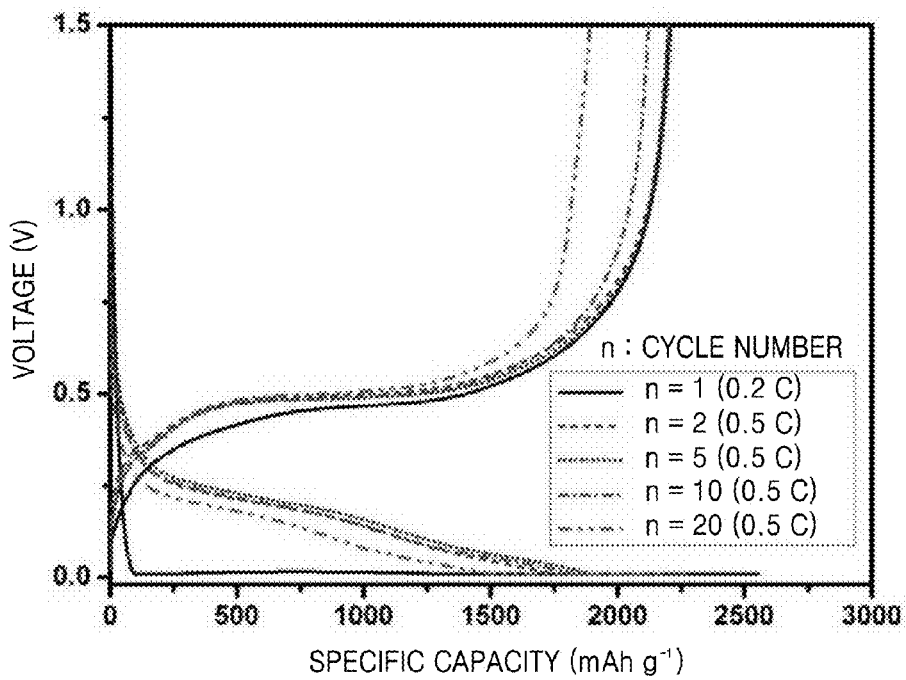
FIG. 8 is a graph of voltage (Volts, V) versus specific capacity (milliampere-hours per gram, $mAhg^{-1}$) showing a voltage profile according to the number of cycles of a coin half-cell manufactured in Example 2.
Figure 9:
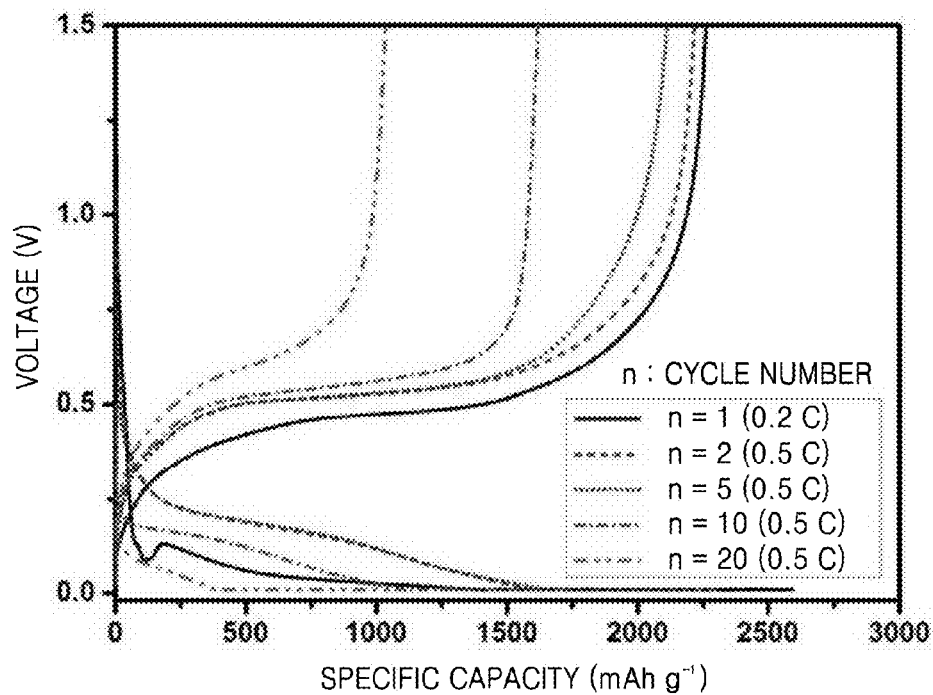
FIG. 9 is a graph of voltage (Volts, V) versus specific capacity (milliampere-hours per gram, $mAhg^{-1}$) showing a voltage profile according to the number of cycles of a coin half-cell manufactured in Comparative Example 2.

Voltage profiles according to the number of cycles of the coin half-cells manufactured in Example 2 and Comparative Example 2 are shown in FIGS. 8 and 9, respectively. FIG. 8 is a graph illustrating a voltage profile according to the number of cycles of the coin half-cell manufactured in Example 2, and FIG. 9 is a graph illustrating a voltage profile according to the number of cycles of the coin half-cell manufactured in Comparative Example 2.

Referring to FIG. 8, it was found that although the number of charge/discharge cycles increased, the coin half-cell manufactured in Example 2 exhibited stable charge/discharge behavior without a drastic decrease of capacity and small potential changes induced by an electrochemical reaction.

On the other hand, referring to FIG. 9, it was found that as the number of charge/discharge cycles increased, the coin half-cell manufactured in Comparative Example 2 exhibited a drastic decrease of capacity and large potential changes induced by an electrochemical reaction.

Differential Capacity Plot Comparison

Figure 10A:
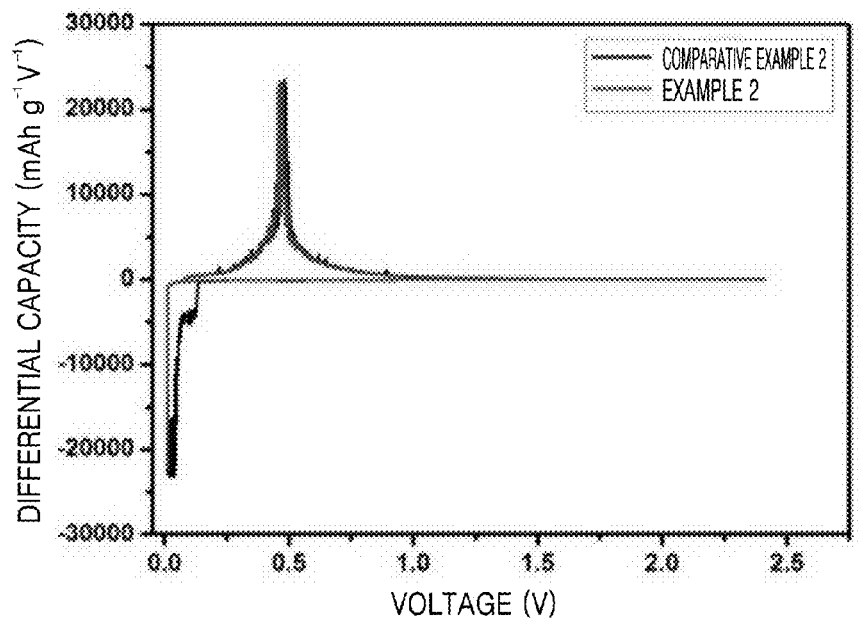
FIGS. 10A to 10E are graphs showing a differential capacity plot comparison between the coin half-cells manufactured in Example 2 and Comparative Example 2, each of which is a graph of differential capacity (milliampere-hours per gram per volt, $mAhg^{-1}V^{-1}$) versus voltage (V)
Figure 10B:
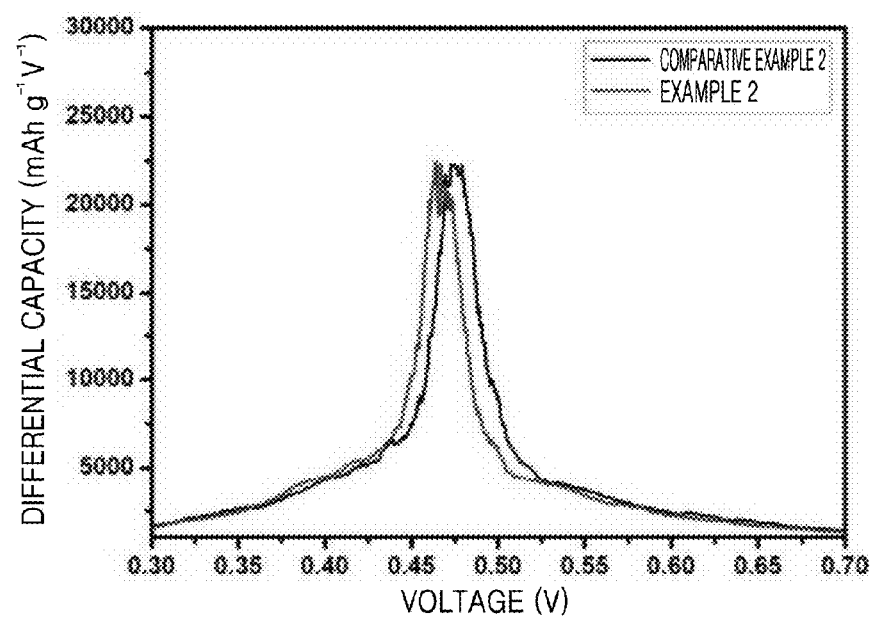
Figure 10C:
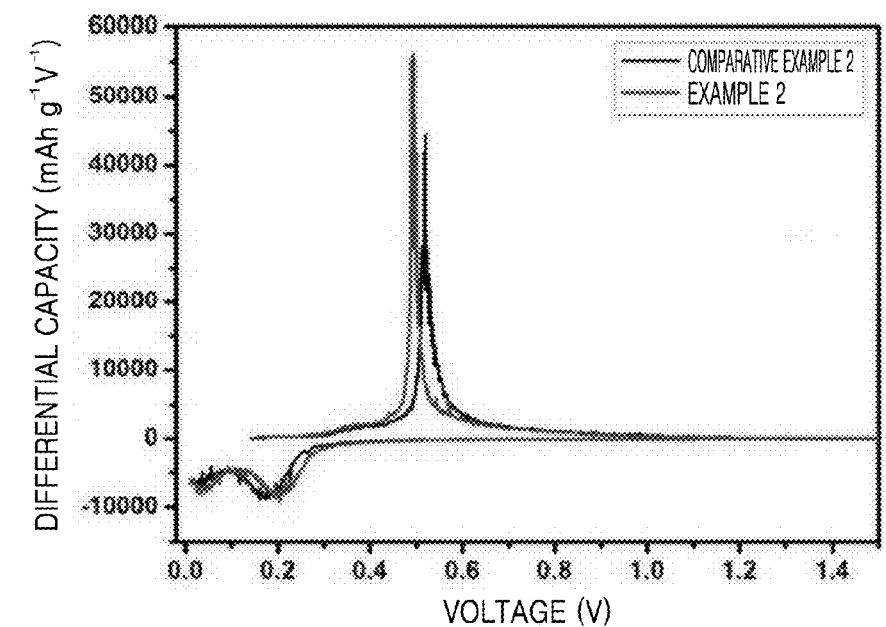
Figure 10D:
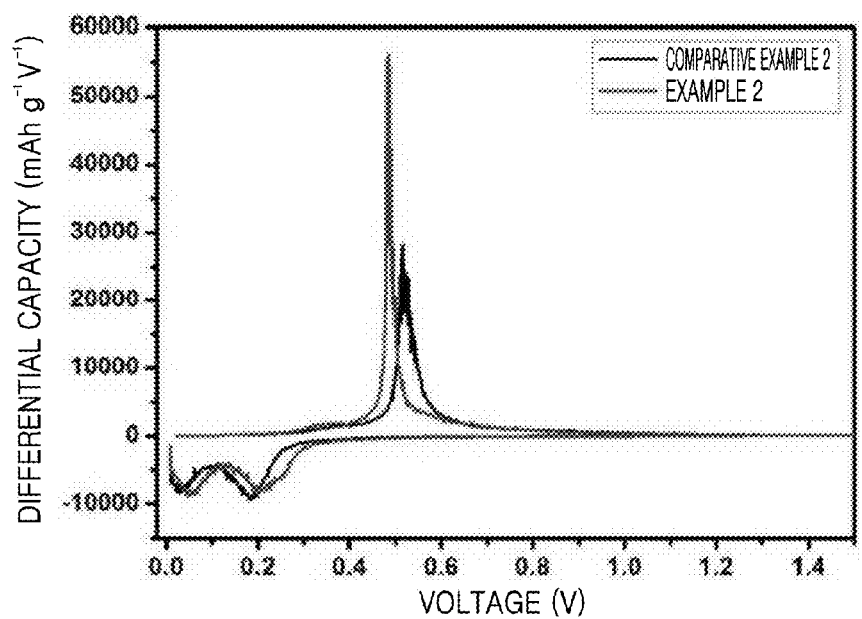
Figure 10E:
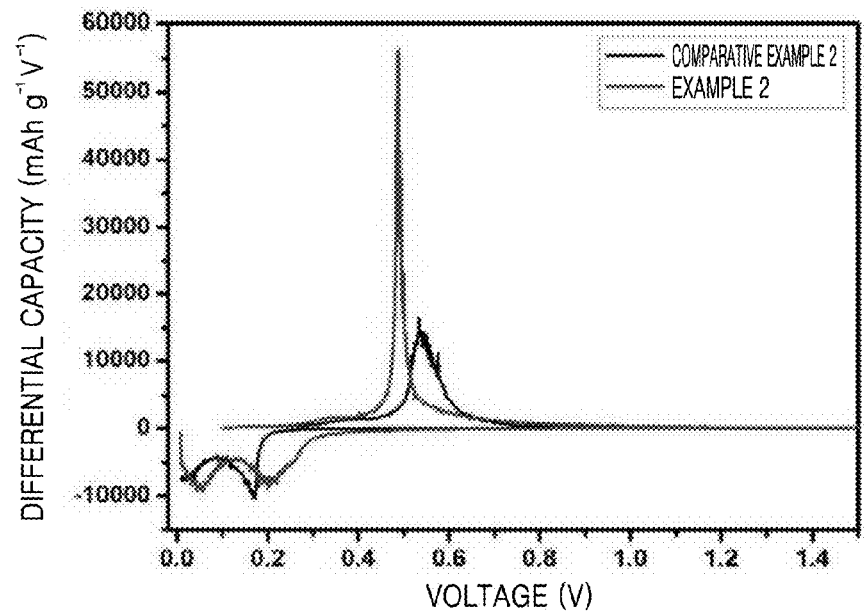

Differential capacity plots of the coin half-cells manufactured in Example 2 and Comparative Example 2 are shown in FIG. 10A to FIG. 10E. FIG. 10A is a differential capacity plot of the first cycle (n=1), FIG. 10B is an enlarged image of FIG. 10A, FIG. 10C is a differential capacity plot of the second cycle (n=2), FIG. 10D is a differential capacity plot of the fifth cycle (n=5), and FIG. 10E is a differential capacity plot of the tenth cycle (n=10).

Referring to FIGS. 10A to 10E, it was found that the coin half-cell manufactured in Example 2 had small potential changes induced by an electrochemical reaction compared to the coin half-cell manufactured in Comparative Example 2. In greater detail, it was found that during discharging in the first cycle, the coin half-cell manufactured in Example 2 had a slightly small reaction potential compared to the coin half-cell of Comparative Example 2. This may be because of a piezoelectric effect exhibited by barium titanate, which was caused by an expansion occurred during the conversion of crystalline silicon to amorphous silicon due to intercalation of lithium ions. In addition, a consistent trend was found, in the second, fifth, and tenth cycles, in that, when charging the coin half-cells, the reaction potential of the coin half-cell manufactured in Example 2 became high compared to that of the coin half-cell manufactured in Comparative Example 2, and when discharging the coin half-cells, the reaction potential of the coin half-cell manufactured in Example 2 became low compared to that of the coin half-cell manufactured in Comparative Example 2. In the case of the coin half-cell manufactured in Example 2, it may be inferred, from the phenomenon in which the reaction potentials of charging and that of discharging approached each other as described above, that the resistance was reduced during the charging and discharging.

Cycle Lifespan Comparison

Figure 11:
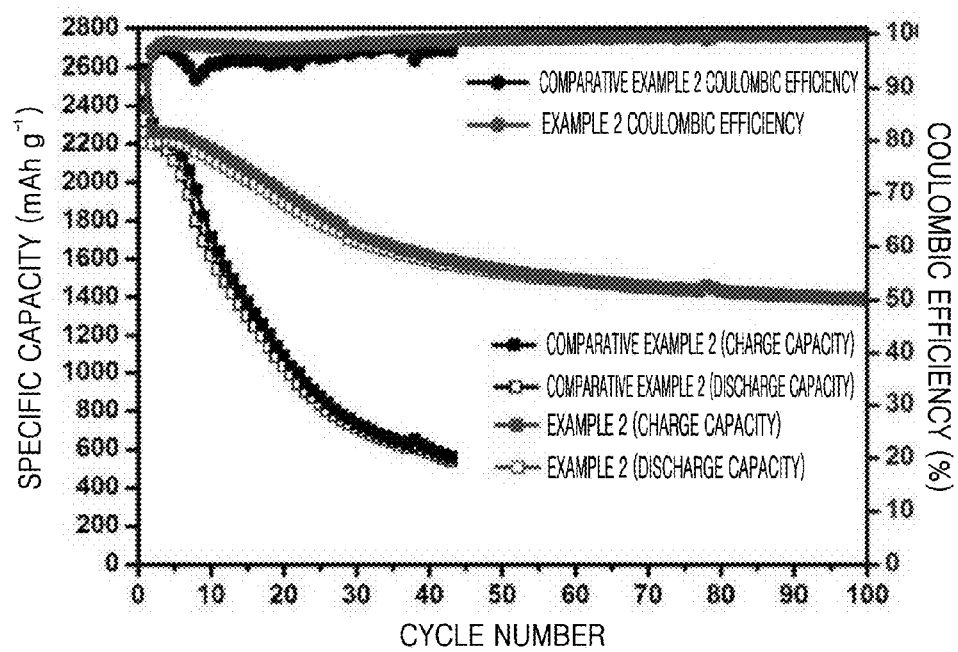
FIG. 11 is a graph of specific capacity (milliampere-hours per gram, $mAhg^{-1}$) versus cycle number showing a cycle lifespan comparison between the coin half-cells manufactured in Example 2 and Comparative Example 2.

Cycle lifespan of the coin half-cells manufactured in Example 2 and Comparative Example 2 are shown in FIG. 11.

Referring to FIG. 11, it was found that the coin half-cell manufactured in Example 2 had an excellent cycle lifespan compared to the coin half-cell manufactured in Comparative Example 2. In greater detail, it was found that the coin half-cell manufactured in Example 2 maintained its capacity of about 1,400 mAhg$^{-1}$ or more up until 90 cycles, exhibiting a high columbic efficiency of about 99.7%. However, the capacity of the coin half-cell manufactured in Comparative Example 2 continually decreased as the number of cycles increased.

Here, columbic efficiency was determined by the following Equation 2.

Columbic Efficiency (%)=Discharge capacity in $n^{th}$ cycle/Charge capacity in $n^{th}$ cycle×100(wherein $n$ is a natural number of 1 or more)   Equation 2

High Rate Discharge Characteristics Comparison

Figure 12:
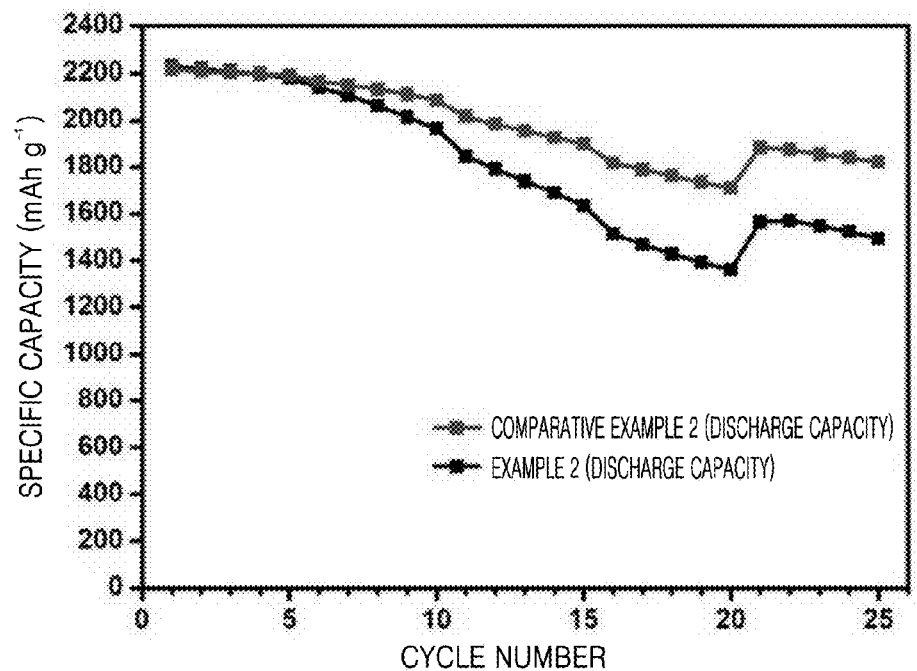
FIG. 12 is a graph of specific capacity (milliampere-hours per gram, $mAhg^{-1}$) versus cycle number showing a high rate discharge characteristics comparison between the coin half-cells manufactured in Example 2 and Comparative Example 2.

Each of the coin half-cells manufactured in Example 2 and Comparative Example 2 was charged under a condition of a constant current of about 0.1 C, a constant voltage of about 1.0 V, and a cut-off current of about 0.01 C. Thereafter, each of the coin half cells was rested for about 10 minutes. Then, each of the coin half-cells was discharged under a condition of a constant current of about 0.2 C, 0.5 C, 1 C, 2 C, 3 C, 5 C, or 10 C until the voltage of about 2.5 V was reached. That is, as the number of charging and discharging cycles increased, the discharging rate was periodically changed to about 0.2 C, 0.5 C, 1 C, 2 C, 3 C, 5 C, and 10 C in order to evaluate high rate discharge characteristics (also referred to as rate capability) of the coin half-cell. Yet, in the first to third cycles of charging and discharging, each cell was discharged at a rate of about 0.1 C. High rate discharge characteristics are shown in FIG. 12. Here, high rate discharge characteristics may be determined by the following Equation 3.

High Rate Discharge Characteristics (%)=(Discharge capacity when discharging a cell at a rate of a specific constant current)/(Discharge capacity when discharging a cell at a rate of 0.1 C)×100   Equation 3

Referring to FIG. 12, it was found that the coin half-cell manufactured in Example 2 had excellent high rate discharge characteristics compared to the coin half-cell manufactured in Comparative Example 2.

Evaluation Example 6: Analysis of XRD Pattern of Composite Negative Active Material The negative electrode was separated from the coin half-cell manufactured in Example 2 that had gone through the high rate discharge characteristics test of Evaluation Example 5. A composite negative active material included in the negative electrode was referred to as a composite negative active material of Example 3.

XRD patterns of the composite negative active material prepared in Example 1, which was an unused negative active material, and the composite negative active material of Example 3, which was a used negative active material, were analyzed by using a Rigaku RINT2200HF$^+$ diffractometer using an X-ray diffraction spectrometer (Cu Kα radiation 1.540598 Å). The results thereof are shown in FIGS. 13A and 13B.

Figure 13A:
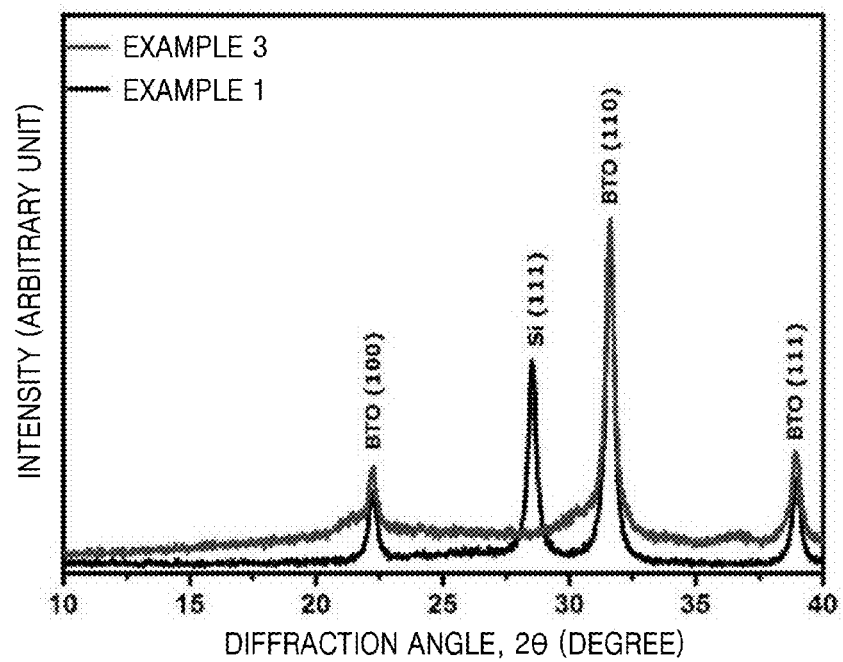
FIGS. 13A and 13B are each a graph of intensity (arbitrary units) versus diffraction angle (2θ, degrees) showing a XRD spectrum comparison between a composite negative active material before being used and the composite negative active material after being used.

Referring to FIG. 13A, it was found that a silicon (Si) peak and a barium titanate (BTO) peak were exhibited in the XRD pattern of the composite negative active material prepared in Example 1. However, in the XRD pattern of the composite negative active material of Example 3, a Si peak disappeared, and only a BTO peak was exhibited. From this fact, it was found that crystalline silicon included in the composite negative active material prepared in Example 1 converted to amorphous silicon, which was identical to silicon included in the composite negative active material of Example 3, due to intercalation of lithium ions induced by an electrochemical reaction.

Figure 13B:
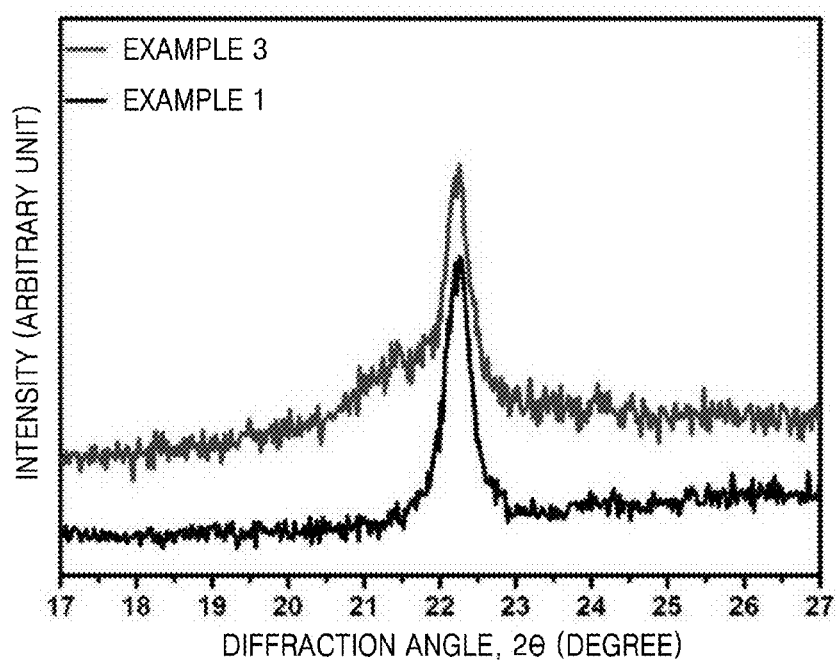

FIG. 13B is a partially enlarged view of FIG. 13A. Referring to FIG. 13B, it was found that a peak width of BTO (a full width at half maximum (FWHM) of 0.61949) of the composite negative active material of Example 3 was considerably broad compared to a peak width of BTO (FWHM=0.36725) of the composite negative active material prepared in Example 1. From this fact, it was found that the composite negative active material prepared in Example 1 was expanded due to intercalation of lithium ions induced by an electrochemical reaction, and BTO included in the composite negative active material was pressurized. This resulted in a piezoelectric effect, in other words, a piezoelectric effect occurred in the composite negative active material of Example 3.

Lithium ions may be intercalated into the composite negative active material according to an exemplary embodiment at a high potential and lithium ions may be deintercalated from the composite negative active material at a low potential, and thus lithium ions may easily be intercalated into and deintercalated from the composite negative active material. Therefore, a negative electrode including the composite negative active material may have improved lifespan characteristics and rate characteristics.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A composite negative active material comprising:
a piezoelectric material;
a non-carbonaceous negative active material; and
a carbonaceous negative active material,
wherein the non-carbonaceous negative active material has a maximum volume expansion of about 10% or more during an electrochemical reaction,
wherein the non-carbonaceous negative active material comprises at least one selected from silicon, germanium, aluminum, tin, and a titanium oxide, and
wherein the carbonaceous negative active material is contained in an amount of 4 weight percent to about 75 weight percent, based on a total weight of the composite negative active material.

2. The composite negative active material of claim 1, wherein
the piezoelectric material comprises at least one selected from $BaTiO_3$, $PbTiO_3$, $Pb[Zr_xT_{1-x}]O_3$ wherein 0≤x≤1, $KNbO_3$, $LiNbO_3$, $LiTaO_3$, $Na_2WO_3$, and ZnO.

3. The composite negative active material of claim 1, wherein
an amount of the piezoelectric material is in a range of about 1 weight percent to about 90 weight percent, based on a total weight of the composite negative active material.

4. The composite negative active material of claim 1, wherein
the non-carbonaceous negative active material has a maximum volume expansion of about 50% or more during an electrochemical reaction.

5. The composite negative active material of claim 4 wherein
the non-carbonaceous negative active material has a maximum volume expansion of about 300% or more during an electrochemical reaction.

6. The composite negative active material of claim 1, wherein
an amount of the non-carbonaceous negative active material is in a range of about 1 weight percent to about 90 weight percent, based on a total weight of the composite negative active material.

7. The composite negative active material of claim 1, wherein
the piezoelectric material is contained in an amount of about 4 weight percent to about 70 weight percent,
the non-carbonaceous negative active material is contained in an amount of about 4 weight percent to about 70 weight percent, and
the carbonaceous negative active material is contained in an amount of about 1 weight percent to about 75 weight percent, each based on a total weight of the composite negative active material.

8. The composite negative active material of claim 1, wherein each of the piezoelectric material, the non-carbonaceous negative active material, and the carbonaceous negative active material are a distinct phase.

9. The composite negative active material of claim 1, wherein the carbonaceous negative active material comprises at least one selected from a carbon nanotube, graphite, graphene, carbon black, and a carbonized polymer.

10. A composite negative active material comprising:
a first phase comprising a piezoelectric material;
a second phase comprising a non-carbonaceous negative active material; and
a third phase comprising a carbonaceous negative active material,
wherein the non-carbonaceous negative active material has a maximum volume expansion of about 10% or more during an electrochemical reaction,
wherein the non-carbonaceous negative active material comprises at least one selected from silicon, germanium, aluminum, tin, and a titanium oxide, and
wherein the carbonaceous negative active material is contained in an amount of 4 weight percent to about 75 weight percent, based on a total weight of the composite negative active material.

11. The composite negative active material of claim 10, wherein the first phase is contained in an amount of about 4 weight percent to about 70 weight percent,
the second phase is contained in an amount of about 4 weight percent to about 70 weight percent, and
the third phase is contained in an amount of weight percent to about 75 weight percent, each based on a total weight of the composite negative active material.

12. A negative electrode comprising a composite negative active material according to claim 1.

13. A lithium secondary battery comprising the negative electrode according to claim 12.

14. A method of preparing a composite negative active material, the method comprising:
contacting a piezoelectric material, a carbonaceous negative active material, and a non-carbonaceous negative active material to form the composite negative active material,
wherein the non-carbonaceous negative active material has a maximum volume expansion of about 10% or more during an electrochemical reaction,
wherein the non-carbonaceous negative active material comprises at least one selected from silicon, germanium, aluminum, tin, and a titanium oxide, and
wherein the carbonaceous negative active material is contained in an amount of 4 weight percent to about 75 weight percent, based on a total weight of the composite negative active material.

15. The method of claim 14, further comprising including a conductive agent in the contacting.

* * * * *